United States Patent
Renner et al.

[11] 3,735,220
[45] May 22, 1973

[54] CONTROL CIRCUIT FOR A D.C. MOTOR

[75] Inventors: Stefan Renner, Silberberg; Wulf Bayha, Hoefingen; Alwin Burgholte, Geisingen; Holger Schweizer, Stuttgart; Rainer Wirtz, Uterriexingen, all of Germany

[73] Assignee: Robert Bosch GmbH, Stuttgart, Germany

[22] Filed: Mar. 12, 1971

[21] Appl. No.: 123,529

[30] Foreign Application Priority Data

Mar. 14, 1970 Germany................P 20 12 230.9

[52] U.S. Cl. ..............318/139, 318/341, 318/376, 318/338, 318/493, 290/14
[51] Int. Cl. ..............................................H02p 3/14
[58] Field of Search...............318/139, 138, 434, 318/341, 326, 327, 375, 376, 338, 493; 292/14

[56] References Cited

UNITED STATES PATENTS

| | | |
|---|---|---|
| 3,555,386 | 1/1971 | Wisman...................318/338 |
| 3,599,064 | 8/1971 | Friedman................318/338 |
| 3,544,873 | 12/1970 | Gunsser..................318/434 |
| 3,569,810 | 3/1971 | Thiele....................318/434 |
| 3,454,122 | 8/1969 | Grady..................318/139 X |
| 3,546,548 | 12/1970 | Wouk.....................318/139 |
| 3,263,142 | 7/1966 | Adoutte et al............290/14 |

Primary Examiner—J. R. Simmons
Attorney—Michael S. Striker

[57] ABSTRACT

The field and armature currents are for the shunt-wound vehicle motor and are controlled in dependence on signals representing the actual and desired operating states of the motor. A series-connection regulating stage is provided for giving the motor a series-connection characteristic during acceleration up to a predetermined nominal speed.

12 Claims, 8 Drawing Figures

Patented May 22, 1973 3,735,220
3 Sheets-Sheet 2
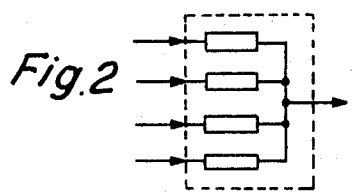
Fig.2
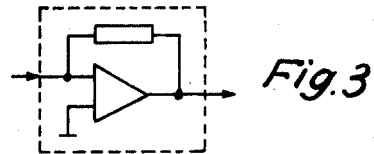
Fig.3
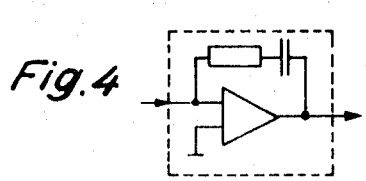
Fig.4
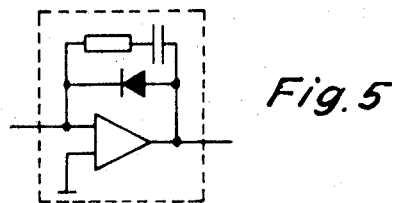
Fig.5
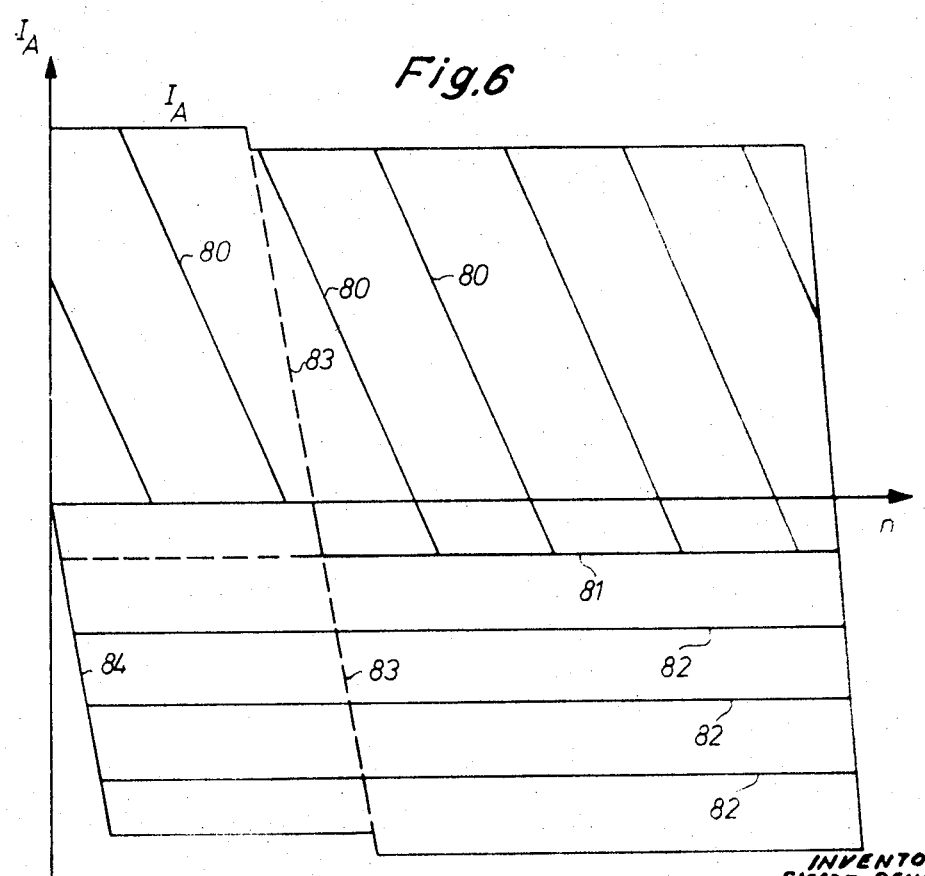
INVENTORS:
Stefan RENNER
Wulf BAYHA
Alwin BURGHOLTE
Holger SCHWEIZER
Rainer WIRTZ
BY
their ATTORNEY INVENTORS:
Stefan RENNER
Wulf BAYHA
Alwin BURGHOLTE
Holger SCHWEIZER
Rainer WIRTZ

BY their ATTORNEY

CONTROL CIRCUIT FOR A D.C. MOTOR

BACKGROUND OF THE INVENTION

The invention relates to a control circuit for a direct current motor intended to power a vehicle, the motor preferably being shunt-wound and battery-operated, and the circuit including means for controlling the armature current and means for controlling the field current of the motor.

Although control circuits of this kind are known, they do not fulfill all of the demands of a motor intended for a vehicle. In particular, no means are provided for regenerative braking or for monitoring the voltage of the battery.

True, it has been suggested, with regenerative braking, to control the field current above the nominal rpm and to hold the armature current constant and, below the nominal rpm, to control the armature current and to hold the field current constant. However, no concrete circuit has been suggested for doing this.

SUMMARY OF THE INVENTION

An object of the present invention is to provide a very simple control circuit to enable a direct current motor to be used for propelling and braking a vehicle in traffic.

Another object of the invention is the circuit of the preceding object, which circuit enables the motor to be operated with a series characteristic at low speeds, so as to obtain the highest possible efficiency.

In accordance with the invention, the operating range of the vehicle is increased by converting kinetic or potential energy back into electrical energy, which partly re-charges the battery.

Briefly, the invention consists of first means for controlling the armature and field currents of the motor, and circuit second means for regulating the operation of the first means in dependence on an adjustable, desired, rpm, the actual rmp, the actual armature current, the actual field current, and on a variable, desired, braking current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIGS. 2, 3, 4, 5, 7 and 8 are wiring diagrams of different components of the circuit shown in FIG. 1; and FIG. 6 is a graph plotting the different currents of the circuit against the motor rpm.

DESCRIPTION OF THE PREFERRED EMBODIMENTS

Figure 1:
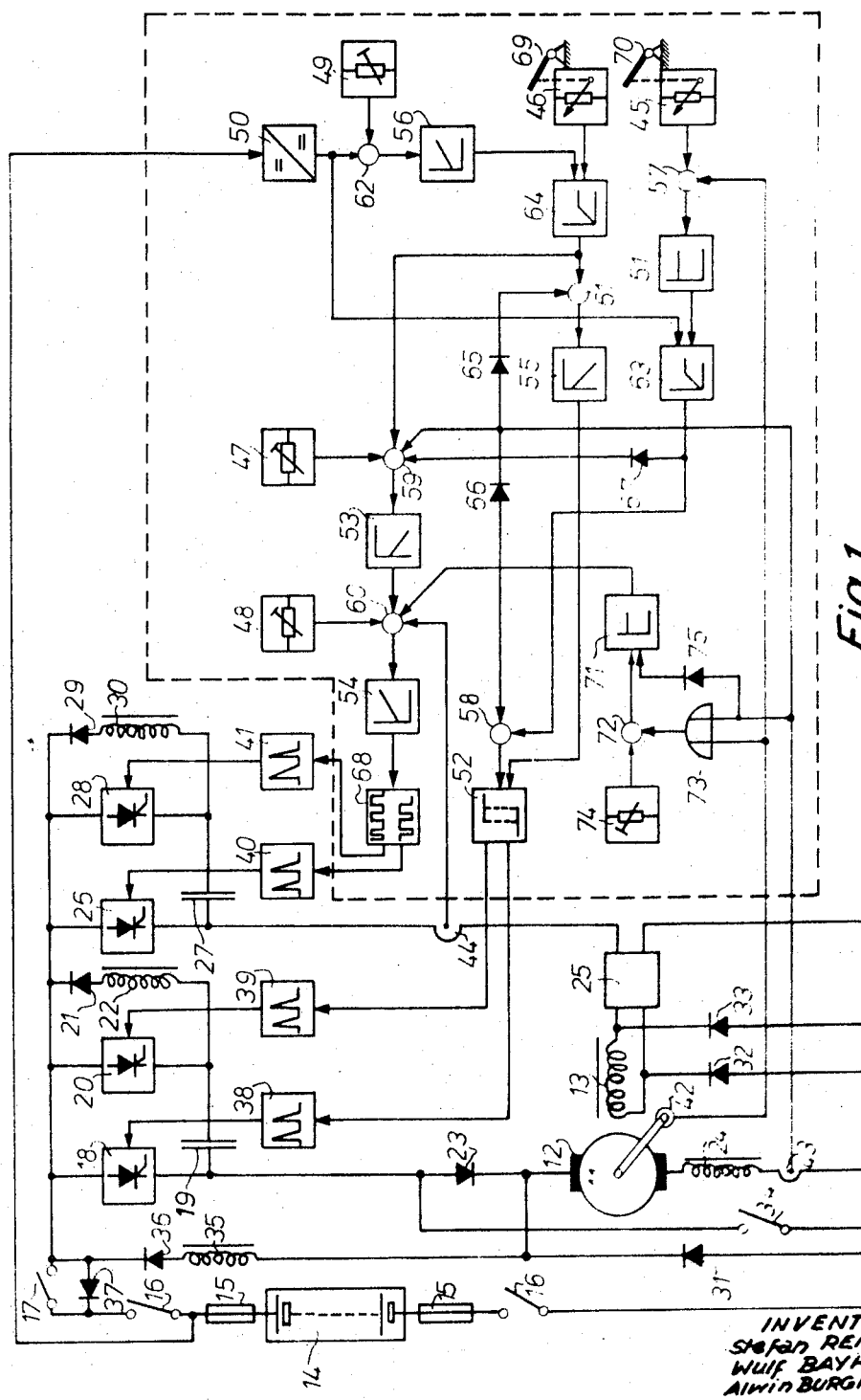
FIG. 1 is a block diagram of the circuit of the invention.

The control circuit shown in FIG. 1 is suitable for vehicle direct current drive motors of any output.

The direct current shunt-wound motor 11 has an armature winding 12 and a field winding 13. The armature winding 12 is connected to a battery 14 by way of fuses or cut-outs 15, a master switch 16, a drive switch 17, and armature current switching thyristor 18, and braking diode 23. A smoothing inductor 24 smoothes the armature current and increases the voltage when braking at low rpm. The electrical output signal of the direct current transducer 43 indicates the value of the armature current.

When driving and braking, the armature current is broken by a first quenching capacitor 19, a first quenching thyristor 20, a first coil 22, and a first diode 21. The field winding 13 is supplied with current through a field current switching thyristor 26, a direct current transducer 44 for providing a signal indicative of the value of the field current, and a polarity reverser 25 for permitting the vehicle to back up. A second quenching capacitor 27, a second quenching thyristor 28, a second diode 29, and a second coil 30 enable the field current to be broken.

The switching thyristors 18 and 26 as well as the quenching thyristors 20 and 28, are triggered by current pulses conducted to their control electrodes, the current pulses being provided by pulse generators 38, 39, 40, and 41. In the particular embodiment described, the pulse generators are blocking oscillators.

A diode 31 is connected between the armature winding 12 and ground, and two diodes 32 and 33 are connected between the field winding 13 and ground.

The drive switch 17 is closed only when the accelerator 70 is depressed. When the brake pedal 69 is depressed, the brake switch 34 is closed. When braking below the nominal speed, the armature current is controlled by the armature current switching thyristor 18. So long as the thyristor 18 conducts, the braking current flows from the armature winding 12, through a switching coil 35, a second braking diode 36, the thyristor 18, and through the brake switch 34 to ground. Since the armature voltage is smaller than the battery voltage, the braking current during this time, flows to ground.

The smoothing inductor 24, which also conducts the braking current, stores magnetic energy during this time. When the thyristor 18 is cut off, its resistance increases greatly. However, the inductor 24 attempts to maintain the flow of current. The voltage across this inductor increases until braking current can flow into the battery through the third braking diode 37. When the magnetic energy is sufficiently used up so that the braking current falls to a lower limiting value, the thyristor 18 is again triggered, permitting the braking current again to rise.

The switching coil 35 is necessary in order to ensure that the thyristor 18 is reliably cut off. Without the switching coil 35, the voltage pulse conducted to the thyristor 18 to cut off the latter will be short-circuited through the braking diodes 23 and 36 after the quenching thyristor 20 is triggered.

In the appended claims, components 18, 38 are referred to as controllable armature-current varying means for varying the armature current by intermittently connecting said armature winding to supply 14, and components 26, 40 are referred to as controllable field-current varying means. Components 42, 57, 45, 70 are referred to as first determining means for determining the motor rpm error, and components 43, 64, 46, 69 are referred to as second determining means for determining the braking current error. Components 51, 63, 43, 58 and 52 are referred to as first control means actuated by said first determining means for controlling the armature current varying means in dependence on the motor rpm error to reduce the motor rpm error.

Pulse generators 38-41 in the described embodiment are blocking oscillators. Examples of such blocking oscillators are illustrated on pages 598 and 601 of "Pulse, Digital and Switching Waveforms" by Millman and Taub, McGraw-Hill Book Company, New York 1965.

Component 25 is a reversing switch of the type designated with reference numeral 54 in FIG. 3 of U.S. Pat. No. 3,555,386.

Figure 7:
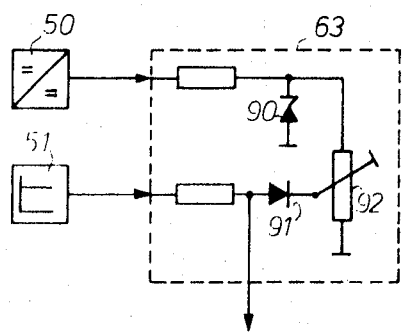

Component 64 is a limiter (i.e., clipper) of the type illustrated in FIG. 7-1(b) of the book by Millman and Taub just referred to.

Component 68 is a pulse-length-modulator of the type shown in FIG. 6 of U.S. Pat. No. 3,500,161 and designated therein with numerals 37, 35, 36.

Component 52 is a two-point regulator like that designated by numeral 46 in U.S. Pat. No. 3,544,873.

Component 56 is an amplifier having a proportional-plus-integral characteristic and has the same circuit configuration as shown in FIG. 4 of the present application.

The components thus far described, as well as the fundamental operations, are known and constitute the starting point of the invention.

The invention is comprised by that part of FIG. 1 enclosed in the dashed lines.

The control circuit operates the pulse generators 38, 39, 40 and 41 by means of an on-off armature current controller 52 and an electronic proportional plus integral controlling unit (PI-controller) 54. In the instance that the field current is being regulated, these pulse generators are controlled through a pulse width modulator 68, and thus control the direct current motor 12 in accordance with its operating condition at any given moment.

In accordance with the invention, either the controller 52 or 54 can be an on-off controller. Either of these two controllers can be a PI-controller. A pulse generator is connected to the output of the PI-controller, the output of the pulse generator being modulated by the controller.

The control circuit obtains the information as to the actual operating condition of the motor by means of a signal generator 42 that provides a voltage signal corresponding to the actual value of the motor rpm, a transducer, or signal generator, 43 that provides a voltage signal corresponding to the actual value of the armature current, a transducer, or signal generator, 44 that provides a voltage signal corresponding to the actual value of the field current, and a transducer, or signal generator, 50 that provides a voltage signal corresponding to the actual voltage of the battery 14. The control circuit obtains information as to the desired operating condition from a signal generator 45, operated by the accelerator 70, the generator 45 providing a voltage signal corresponding to the desired rpm, and from a signal generator 46, operated by the braking pedal 69, the generator 46 providing a voltage signal corresponding to the desired braking current.

The armature current regulating circuit contains the signal generator 45, a first adder 57, an rpm controller 51, an armature current limiter 63, a second adder 58, and an armature current controller 52.

In the embodiment described, the controllers (such as 51) have current amplifiers and are driven by direct current signals. The adders, which are connected to the inputs of the controllers, can be designed as shown in FIG. 2, there being a respective resistor for each input signal, the resistors having a high resistance as compared to the output resistance of the signal source.

The rpm controller 51 is designed as a proportional action controller, and, as shown in FIG. 3, comprises an integrated operational amplifier of which the second input is connected to ground and the output is connected by a negative feedback resistor to the first input. By changing the amplification factor of the controller 51, there can be obtained any desired slope of the characteristic curves 80, shown in FIG. 6. In particular, the two limiting cases are possible in which every position of the accelerator 70 is associated with a constant rpm or a constant armature current.

The braking current regulating circuit contains the signal generator 46, the desired braking current limiter 64, the fourth adder 61, and the braking current controller 55.

The braking current controller 55 is designed as a PI-controller; and, as with the proportional action controller (see FIG. 3), an operational amplifier is used of which the output, as shown in FIG. 4, is connected by a negative feedback network, composed of a series-connected capacitor and resistor, to the one input.

The field current regulating circuit comprises a third adder 59, an adjustable preset desired braking current signal generator 47, a field regulating stage for reducing the field 53, a fifth adder 60, an adjustable preset maximum field current limiter signal generator 48, a field current controller 54, and the pulse width modulator 68.

As shown in FIG. 5, the field regulating stage 53 comprises an operational amplifier of which the output is degeneratively coupled to one input by an RC network and a diode. This ensures that the PI action obtained is effective only for signals of one polarity.

The field current controller 54 is designed in the same way as is the PI-controller shown in FIG. 4.

The pulse width modulator 68 modulates the field current with pulses of variable width and constant frequency. The width of the pulses is modulated in accordance with the input signal obtained from the output of the field current controller 54.

Figure 8:
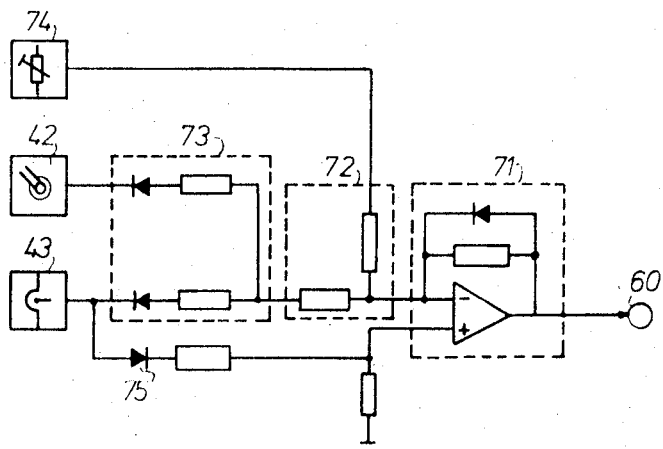

When the vehicle is under way, the motor 12 should have a series-wound characteristic. For this purpose, there are provided a series-connection regulator 71, a seventh adder 72, an adjustable preset minimum field current signal generator 74, an OR gate 73, and a diode 75. The design of these components is shown in FIG. 8.

The battery current regulating circuit comprises the direct current transducer 50, a sixth adder 62, an adjustable preset maximum battery voltage signal generator 49, and a battery voltage regulator 56, the latter being designed as a PI-controller and connected to the second input of the desired braking current limiter 64.

The output of the transducer 43 is connected by a second diode 65 to the first input of the first adder 61, by a third diode 66 to the second input of the second adder 58, and is connected directly to the second input of the third adder 59. The armature current directly influences both the field current regulating circuit and the armature current regulating circuit. It also influences the armature current regulating circuit by way of the braking current regulating circuit.

The output of the armature current limiter 63 is directly connected to the first input of the second adder 58 and is connected by a first diode 67 to the first input of the third adder 59.

The remaining connections of the control circuit and the directions in which the signals are conducted are shown in FIG. 1 and will be explained in the description of the operation.

Rectangular voltage pulses are conducted through the switching thyristors 18 and 26 to the armature and field windings 12 and 13, respectively. Because of the high inductance in the armature and field circuits, the currents are smoothed, so that low-ripple D.C. currents flow through the windings. The average armature voltage or field voltage is therefore equal to the battery voltage multiplied by the keying ratio. The keying ratio is the same as the ratio of the on time to the complete cycle.

The keying ratio can be varied by pulse frequency modulation, pulse width modulation, or by a combination of pulse frequency and pulse width modulation. In the embodiment described, the field current is modulated by pulse width modulation and the armature current is modulated by a combination of pulse frequency and pulse width modulation, although, in accordance with the invention, any other combination of modulation schemes is possible. Other combinations may be more advantageous with a different choice of components for the control circuit. The control is simplified if the field winding is so designed that the maximum exciting flux is reached at a voltage that is smaller than the battery voltage. In this case, even at maximum field current, the keying ratio is less than 1:1, in other words, the thyristor 26 is never continuously on.

The desired rpm signal generator 45 and the adjustable preset maximum current limiter signal generator 48 provide positive direct current signals to the respective controllers 51 and 54, whereas the three signal generators 42, 43, and 44 —respectively providing the actual value of the motor rpm, of the armature current, and of the field current— as well as the desired braking current signal generator 46 and the adjustable preset desired braking current signal generator 47, all provide a negative direct current signal. The manner in which these signals combine to influence the controllers 51, 52, 54, and 55 during the different operating conditions will now be described.

ACCELERATION

The armature current controller 52 triggers the switching thyristor 18 when one of the inputs of the controller receives a positive signal, and turns off the thyristor when a negative signal is received. The positive signal is obtained from the desired rpm signal generator 45. This positive signal is compared in the rpm controller 51 with the negative signal from the actual rpm signal generator 42. So long as the desired value is greater than the actual value, there appears at the output of the controller 51 a positive signal that indicates the desired value of the armature current. Since this desired value can exceed the permissible armature current when the vehicle begins to accelerate from rest, an armature current limiter 63 is provided.

The armature current transducer 43 provides, by way of the diode 66, a negative signal for the input of the armature current controller 52, thereby ensuring that the switching thyristor 18 is turned off as soon as the actual value of the armature current exceeds the desired value. The actual value consequently falls below the desired value. The pulse frequency and the pulse width depend on the operating condition.

The field current regulator comprises the field current controller 54 and the pulse width modulator 68. The positive desired value signal is obtained from the maximum field current limiter signal generator 48, and the negative actual value signal is obtained from the transducer 44, which provides a signal corresponding to the actual value of the field current. In a simplified embodiment, not shown in FIG. 1, the components 71 through 75 are removed and the field current control functions up to the nominal rpm in the same manner as does the armature current, although the field current is always held at the maximum value because the maximum field current limiter signal generator 48 is preset.

However, the embodiment illustrated in FIG. 1 has means for giving the motor 11 a series-wound characteristic during driving, so as to improve the efficiency.

The series-connection regulator 71 comprises an operational amplifier, as shown in FIG. 8, and is therefore a proportional action controller, which only provides negative signals. The seventh adder 72 is connected to the inverting input of the operational amplifier, and the diode 75 is connected to the non-inverting input of this amplifier.

When the motor 11 is stopped, and the armature current is zero, only the positive signal from the minimum field current signal generator 74 is present at the inverting input of the operational amplifier of the series-connection regulator 71, so that this regulator provides a negative signal that is conducted by way of the fifth adder 60 to the field current controller 54 to cause a minimum field current.

With increasing armature current, or with increasing rpm, a negative voltage is conducted by the OR gate 73 to the seventh adder 72, which negative voltage opposes the positive voltage from the signal generator 74. Consequently, the output signal of the regulator 71 is less positive, and the field current is increased.

In dependence on the desired operation of the motor 11, it is possible to vary the values of the resistors in the OR gate 73 and in the seventh adder 72 so as to cause the motor to change from series-wound characteristic to the shunt-wound characteristic in accordance with various criteria. This change will then occur at a definite armature current or at a definite rpm.

Above the nominal rpm, the strength of the field must be reduced, in order to permit the motor to increase its rpm. To this end, a field regulating stage 53 is provided. This stage inverts the sign of the input signal and suppresses negative input signals.

Below the nominal rpm, the input signal to the stage 53 is negative, since the values of the resistors in the third adder 59 are so chosen that the actual value of the armature current, the desired value of the armature current, and the signal from the desired braking current signal generator 47 are balanced. For this reason, the stage 53 provides no output signal and does not influence the regulation of the field current.

As soon as the nominal rpm is exceeded, the armature current falls along the shunt-winding characteristic curve 83, shown in FIG. 6. The desired value of the armature current consequently predominates over the two negative signals at the input of the field regulating stage 53, which latter delivers a negative signal to the field current controller 54, so that the field current is reduced by reducing the keying ratio. The desired value of the rpm determines how much the field is weakened: in other words, it determines according to which characteristic curve 80, shown in FIG. 6, the armature current $I_A$ falls.

BRAKING

As soon as the accelerator 70 is released above the nominal rpm, the desired value of the armature current at the output of the rpm controller 51 is negative; and the thyristor 18 remains continuously cut off.

If the desired braking current signal generator 47 were not present, there would be no signal at the input of the field regulating stage 53, since the actual value of the armature current is zero; and the negative signal of the desired value of the armature current cannot be conducted to the third adder 59 because of the diode 67. The field current is held to the set value, so that the vehicle coasts without either braking or accelerating.

The desired braking current signal generator 47 now provides an additional negative signal to the input of the stage 53, whereby the field is strengthened. The armature voltage rises until it is higher than the battery voltage, so that a braking current flows from the motor 11 to the components 35, 36, and 37 into the battery 14, as the coil 81 in FIG. 6 shows. The result is a braking action that corresponds to the engine braking of an internal combustion engine.

The positive output signal provided by the armature current actual value signal generator 43 is conducted by the diode 65 to the input of the braking current controller 55, which inverts the signal, so that the thyristor 18 remains conductive, since only negative signals are at both inputs of the armature current controller.

For sharper braking, the driver pushes down on the braking pedal. When the accelerator 70 is released, the drive switch 17 is automatically opened; the braking current, therefore, is free to flow into the battery 14 only through the third braking diode 37. The braking pedal 69 closes the braking switch 34. At the same time, the desired braking current signal generator 46 provides a negative signal that is sufficiently limited by the desired braking current limiter 64, so that it is not larger than the positive output signal of the actual armature current signal generator 43. Consequently, the thyristor 18 remains continuously cut off in the range above the nominal rpm.

The negative signal from the signal generator 46 is conducted to the input of the field regulating stage 53, thereby further strengthening the field and increasing the braking current to a larger constant value. The braking current remains constant along one of the characteristic curves 82, shown in FIG. 6. Which curve 82 expresses the braking current is determined by the field, which latter is determined by the generator 46.

The rpm falls until the nominal rpm is reached at the maximum field current. The amount of the braking current then falls along the shunt-winding characteristic curve 83, shown in FIG. 6, and the braking action correspondingly declines.

The control circuit of the invention also enables regenerative braking at small rpms. As soon as the braking current falls, the output signal of the actual armature current signal generator 43 is less positive; this means that the negative signal of the desired braking current signal generator 46 predominates at the input of the braking current controller 55. A positive signal is consequently conducted to the second input of the armature current controller 52, thereby re-triggering the thyristor 18.

A braking current can now flow even when the armature voltage is smaller than the battery voltage, the braking current passing through the switching coil 35, the second braking diode 36, the thyristor 18, and the brake switch 34 to ground. The armature current increases, and the output signal of the actual armature current signal generator 43 is again positive. As soon as the signal of the desired braking current is exceeded, the braking current controller 55 turns off the thyristor 18.

So long as the thyristor 18 was conductive, the braking current was conducted through the brake switch 34 to ground. During this time, the smoothing inductor 24 stored magnetic energy. After the thyristor 18 is cut off, the actual regenerative braking begins. The resistance of the thyristor 18 suddenly increases greatly when the thyristor is cut off. The inductor 24 attempts to maintain the current flow, a fact that causes a voltage peak across the inductor. This permits the braking current again to flow back into the battery until the magnetic energy of the inductor is sufficiently used up so that the voltage across the armature winding of the inductor 24 is again smaller than the battery voltage. The armature current then suddenly falls, so that the thyristor 18 is again triggered.

With regenerative braking below the nominal rpm, the smoothing inductor 24 thus acts as an energy buffer, which stores energy while the thyristor 18 conducts and supplies energy to the battery 14 when the thyristor is non-conductive.

With regenerative braking below the nominal rpm, the motor 11 must not have any series-connection characteristic. For this purpose, there is provided a diode 75, which routes the positive signal (when braking) of the generator 43 to the non-inverting input of the series-connection regulator 71, and thereby causes the output signal of the latter to be zero, independent of the rpm.

Thus, when braking below the nominal rpm, the circuit is set to the maximum field current. Only when the braking current declines along the curve 84, (see FIG. 6), is the circuit set to the minimum field current.

There will now be described the manner of operation of the battery current regulator, which consists of the components 49, 50, 56 and 62, and which acts on the armature current limiter 63 and on the desired braking current limiter 64.

FIG. 7 shows the wiring diagram of the armature current limiter 63. The tap of the potentiometer 92 is set to a definite voltage that the signal of the desired value of the armature current cannot exceed. If this signal begins to rise above this voltage, a current flows through the diode 91 and the potentiometer 92 to ground. The signal of the desired value is thus limited to the voltage at the tap of the potentiometer 92.

The zener diode 90 limits the signal of the actual value of the battery voltage to a value corresponding to the minimum permissible battery voltage and provides the reference voltage for the potentiometer 92. If the battery voltage falls below the minimum value, the voltage at the potentiometer tap also falls; and the armature current is limited to a smaller value. The battery consequently cannot be excessively discharged.

The life of the battery 14 is prolonged if care is taken not to discharge the battery too much, and also not to charge the battery excessively when the vehicle with a freshly-charged battery makes an extended descent. For this reason, it is particularly advantageous, in accordance with the invention, to provide means, as previously explained, for controlling the circuit in dependence on the actual value of the battery voltage.

The battery voltage regulator 56 limits the braking current when the gassing voltage of the battery is reached during regenerative braking.

The circuit of the desired braking current limiter 64 is similar to that shown in FIG. 7, except that there is no zener diode. The battery voltage regulator 56 is so designed that it provides a maximum negative signal so long as at its input the negative signal from the preset maximum battery voltage signal generator 49 is larger than the positive signal from the voltage transducer 50, which provides a signal corresponding to the actual value of the battery voltage. As soon as the signal from 50 is greater than the signal from 49, the output signal from the battery voltage regulator 46 is less negative and thus limits the signal of the desired braking current limiter 64.

In the embodiments just described, the signal generators and transducers provide direct current signals, and the various controllers, such as 51 and 54, contain direct current amplifiers. In accordance with the invention, the circuits can also be so designed to use other kinds of signals, such as pulses or frequency or amplitude modulated signals.

It will be understood that each of the elements described above, or two or more together, may also find a useful application in other types of circuits differing from the types described above.

While the invention has been illustrated and described as embodied in a control circuit or a direct current motor, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A control circuit for operating a D.C. motor having an armature winding and a field winding, particularly for operating a D.C. mover serving as prime mover in an electric vehicle, comprising, in combination, a rechargeable energy supply; first means for varying the armature and field currents, including controllable armature-current varying means for varying the armature current by intermittently connecting said armature winding to said supply so as to provide intermittent energizing pulses to said armature winding, and also including controllable field-current varying means for varying the field current by applying to said field winding intermittent energizing pulses, said armature-current varying means and said field-current varying means being separately controllable; first determining means for determining the motor rpm error of said D.C. motor; first control means actuated by said first determining means for controlling said armature current varying means in dependence on said motor rpm error so as to reduce said motor rpm error; second determining means for determining the braking current error of said D.C. motor; and second control means actuated by said second determining means for effecting flow of regenerative braking current from said armature winding into said supply by controlling in a higher range of said motor rpm said field-current varying means and in a lower range of said motor rpm said armature-current varying means in dependence upon said braking current error to reduce the braking current error.

2. A circuit as defined in claim 1, wherein said first determining means comprises first setting means for setting a commanded motor rpm and first transducer means for determining the actual motor rpm, and wherein said second determining means comprises second setting means for setting a commanded braking current and second armature current transducer means for determining the actual braking current.

3. A circuit as defined in claim 2, wherein said second means comprises a field current regulating circuit which includes a field current controller connected to said field-current varying means, said controller having at its input an adding stage, and means for applying to said adding stage a signal indicative of the field current magnitude, means for applying to said adding stage a signal indicative of the armature current error, and means connected to said adding stage for setting a maximum field current.

4. A control circuit as defined in claim 3, wherein the motor is of the shunt type, further comprising a series connection regulator connected to said adding stage; an additional adding stage connected to one input of said series connection regulator; a preset minimum field current generator connected to one input of said additional adding stage; an OR-gate having an output connected to another input of said additional adding stage and having two inputs one input of the OR-gate being connected to said second transducer means, and the other input of said OR-gate being connected to said first transducer means and a diode connected between said one input of said OR-gate and another input of said series connection regulator, whereby when the motor is stopped the field current is at a minimum value, the field current increasing in value with increasing armature current or with increasing motor rpm to simulate the characteristics of a series-wound motor.

5. A control circuit as defined in claim 3, said rechargeable supply being a battery; further comprising means connected to the battery for regulating the battery voltage; a desired braking current limiter having one input connected to said means for regulating the battery voltage and another input connected to said second setting means; an additional adding stage having a first input connected to the output of said desired braking current limiter; a field regulation stage having its output connected to a third input of said adding stage and having its input connected to the output of said additional adding stage, said second transducer means monitoring the armature current and being connected to a second input of said additional adding stage.

6. A control circuit as defined in claim 5, further comprising a diode connected between a third input of said additional adding stage and said first setting means.

7. A control circuit as defined in claim 2, said second means comprising an armature regulating circuit which includes an armature current controller having its output connected to said armature-current varying means and having two inputs; a first adding stage having one input connected to said first setting means, another input of said first adding stage being connected to said first transducer means; an rpm controller whose input is connected to the output of said first adding stage, the output of said rpm controller being connected to one of the inputs of said armature current controller.

8. A control circuit as defined in claim 7, said supply being a battery, further comprising means connected to the battery for monitoring the battery voltage; an armature current limiter having one input connected to said rpm controller and another input connected to said means for monitoring the battery voltage; a second adding stage having its output connected to said one input of said armature current controller, and having one input connected to said armature current limiter; and a diode connected to another input of said second adding stage and to said means for monitoring the current flowing through the armature.

9. A control circuit as defined in claim 7, said supply being a battery, further comprising means connected to the battery for regulating the battery voltage; a desired current braking limiter having one input connected to said means for regulating the battery voltage and another input connected to said second setting means; a second adding stage having one input connected to the output of said desired current braking limiter; a diode connected between said second transducer means and another input of said second adding stage; and a braking current controller connected between the output of said second adding stage and the other input of said armature current controller.

10. A control circuit as defined in claim 2, said supply comprising a battery, wherein said second means comprises means connected to the battery for monitoring the voltage thereof; an adding stage having one input thereof connected to the output of said voltage monitoring means; a preset maximum voltage signal generator connected to another input of said adding stage; and a battery voltage regulator having its input connected to the output of said adding stage; and means connected to the outputs of said voltage monitoring means and said voltage regulator for controlling the armature and field currents as a function of the monitored and the preset battery voltages.

11. A control circuit as defined in claim 2, further comprising a smoothing inductor connected to one terminal of the armature winding; said second transducer being connected between said smoothing inductor and the circuit ground; a diode connected to the other terminal of the armature winding; wherein said armature-current varying means includes a thyristor connected to said diode, and a drive switch normally open during breaking connected between the battery and said thyristor, whereby the latter controls the current delivered to the armature when said drive switch is closed.

12. A control circuit as defined in claim 11, further comprising a brake switch, normally closed during braking, and connected between the connecting point between said thyristor and said diode and the circuit ground; a switching coil connected to said other terminal of the armature; a braking diode connected to said switching coil; and an other braking diode connected to the first mentioned braking diode and the supply, said other braking diode being connected in parallel to said drive switch, whereby recharging of the supply can take place below nominal rpm by the switching of said thyristor.

* * * * *